United States Patent Office 3,320,021
Patented May 16, 1967

3,320,021
PROCESS FOR THE DYEING OF SYNTHETIC POLYAMIDES
Jacques Guenthard, Binningen, Basel-Land, Switzerland, assignor to Sandoz Ltd., also known as Sandoz A.G., Basel, Switzerland
No Drawing. Filed Dec. 1, 1965, Ser. No. 510,939
6 Claims. (Cl. 8—39)

The use of wool dyes for dyeing synthetic polyamides is known. Dyes which build up well on wool and give fast wool dyeings are used, because experience has shown that the properties of wool dyes are no better on synthetic polyamides than on wood and that it is not worth while to test dyes for synthetic polyamides which give unsatisfactory dyeings on wool.

It has now been found that the known compounds of the formula

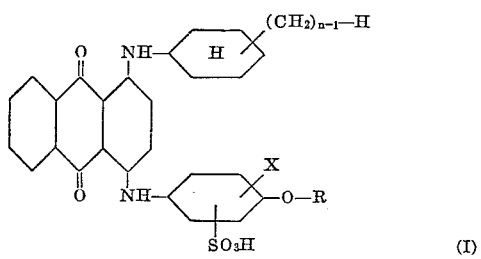

give valuable dyeings on fibers and fiber materials of synthetic polyamides, although they do not give serviceable dyeings on wool.

In Formula I, R represents low molecular alkyl or cycloalkyl which may be substituted, X represents hydrogen, halogen, low molecular alkyl or alkoxy which may be substituted, $n$ represents 1 or 2, and at least one of the ortho-positions of the phenyl radical relative to the —NH— group is unsubstituted.

Examples of hydrophobic synthetic linear polyamide fibers are the condensation products of 1,6-hexamethylenediamine and adipic acid (nylon 66) or sebacic acid (nylon 610), the polymerization products of ε-caprolactam (nylon 6), the condensation products of ω-aminoundecanoic acid (nylon 11) and the heterogeneous condensation products of 1,6-hexamethylenediamine, adipic acid and ε-caprolactam.

These materials are generally dyed with so-called acid wool dyes, which are dyes that build up on wool from an acid bath and dye this fiber in shades fast to light and to wet treatments, such as washing and perspiration.

According to the teaching of United States Patents 1,821,043 and 2,051,005, N-substituted 1,4-diaminoanthraquinones, in particular the dyes of Examples 4 and 7, respectively, can be used for dyeing wool, but the dyeing of synthetic polyamides is not referred to in these patents. These dyes give unsatisfactory dyeings on wool, the wet fastness properties in particular being insufficient.

Practical experience has shown that dyes which give unsatisfactory dyeings on wool also dye synthetic polyamides unsatisfactorily. It was surprising and could in no way be expected that the dyes of Formula I would give valuable dyeings on synthetic polyamides since they are not good for dyeing wool. The wet fastness properties, for instance, of dyeings on synthetic polyamides are substantially better than those of wool dyeings.

The dyes of Formula I are applied to synthetic polyamides preferably at temperatures above 95° C., for example at 98–100° C., or at temperatures up to about 130° C. with pressure; the dyeing times vary from about 30 to 120 minutes, being on the average one hour. The dye bath is set with acetic, formic or sulfuric acid or ammonium acetate or sulfate, or alternatively with a mixture of sodium acetate and an acid, such as sulfuric and acetic acid, to obtain the required pH value; it is advisable to dye in a weakly acid medium at pH 4 to 6, or preferably, 4.5 to 5. The levelness of the dyeings can be promoted and/or the barry appearance of the material covered by using additions of neutral salts, e.g., sodium sulfate, or of anionic, e.g., sodium dinaphthylmethane disulfonate and highly sulfonated castor oil, or nonionic compounds, e.g., alkylpolyglycol ethers, alkylarylpolyglycol ethers, and the reaction products of alkylamides or fatty acid amides and ethylene oxide.

The cyclohexyl radical in the dyes of Formula I may be unsubstituted or it may bear a methyl group in one of the positions ortho, meta or para to the amino group, in which case a mixture of the three isomeric methylcyclohexyls is suitable.

The radical R may be a low molecular, substituted or unsubstituted, alkyl having for example 1 to 6 carbon atoms, such as methyl, ethyl, propyl, butyl, chloroethyl, cyanoethyl, hydroxyethyl; or a cycloalkyl radical which may be substituted or unsubstituted, such as cyclohexyl or methylcyclohexyl.

The substituent X of the phenyl nucleus may be hydrogen or a halogen atom (chlorine, bromine, fluorine), a low molecular, substituted or unsubstituted, alkyl (methyl, ethyl, isopropyl, chloroethyl, cyanoethyl, hydroxyethyl, benzyl), or a low molecular, substituted or unsubstituted, alkoxy (methoxy, ethoxy, butoxy). When two substituents are present at least one of the positions ortho to the —NH— group must be unsubstituted, e.g., 2-methyl-4-methoxy.

These dyestuffs can be produced, for example, by condensing a 1-cyclohexylamino- or 1-methylcyclohexylamino-4-aminoethraquinone with a bromobenzene of formula

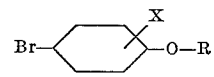

and then sulfonating the dye bases. When X stands for halogen, this halogen also can be introduced by halogenation of the condensation product before sulfonation.

The dyeings obtained with these dyes have very good light and wet fastness properties including fastness to acid and alkaline perspiration, water, sea water, chlorinated swimming pool water, Permutit water, rubbing and sublimation. The dyes have high saturation values on synthetic polyamides and good build-up properties.

In the following example the parts and percentages are by weight and the temperatures are in degrees centigrade.

*Example 1*

100 parts of nylon 66 yarn in hank form are wetted out and entered into a bath consisting of 6000 parts of water, 4 parts of ammonium sulfate and 1 part of the dye of formula

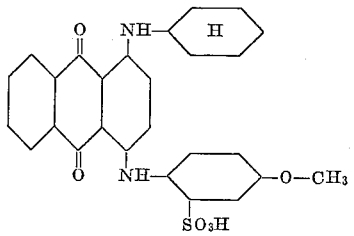

The bath is raised to 100° in 20 minutes and held at this temperature for 30 minutes, after which the evaporated water is replaced, 1 part of concentrated acetic acid added and dyeing continued for 30 minutes at 100°. The yarn is then removed, rinsed well with water and dried at 100°. The resulting dyeing has an attractive turquoise shade and has very good fastness to light, perspiration, washing at 60°, rubbing and sublimation, and good fastness to washing at 80°.

Equally good results are obtained on yarn of nylon 6 fiber using this dye and dyeing method.

The dye used in this example can be produced as follows:

21.3 parts of 1-cyclohexylamino-4-(4'-methoxyphenylamino)-anthraquinone, prepared by condensing 1-cyclohexylamino - 4 - aminoanthraquinone with 1-bromo-4-methoxybenzene, are dissolved at −5° to 0° in a mixture of 100 parts of 100% sulfuric acid and 20 parts of 25% oleum. The mixture is stirred at 0° until a sample completely dissolves in water, which is the case after about 1 hour. It is then run into 400 parts of a mixture of water and ice, the thereby precipitated dye filtered off with suction and washed with a little cold water. The filter cake is pasted with water and sufficient sodium carbonate to increase the pH value to 7.5. The paste is dried and the dry dye ground to a fine powder.

The following table contains further examples of the application of the invention disclosed herein. These examples are characterized by the dye base which is converted by sulfonation into the final dye used, and by the shade of the dyeing on nylon 66.

| Example No. | Dye Base | Shade of Dyeing on Nylon 66 |
| --- | --- | --- |
| 2 | 1-cyclohexylamino-4-(4'-methoxy-3'-bromophenylamino)-anthraquinone. | Green-blue. |
| 3 | 1-(4'methylcyclohexylamino)-4-(4''-methoxyphenylamino)-anthraquinone. | Do. |
| 4 | 1-cyclohexylamino-4-(4'-tert. butoxyphenylamino)-anthraquinone. | Turquoise blue. |
| 5 | 1-cyclohexylamino-4-(4'-ethoxyphenylamino)-anthraquinone. | Do. |

Having thus disclosed the invention, what I claim is:

1. In the dyeing of hydrophobic synthetic linear polyamides from a weakly acid to neutral dyebath with acid dye, the improvement wherein the acid dye is dye of the formula

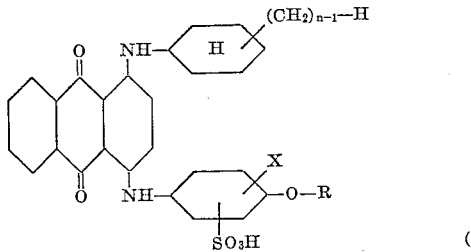

(I)

wherein
R represents a member selected from the group consisting of substituted and unsubstituted low molecular alkyl and cycloalkyl,
X represents a member selected from the group consisting of hydrogen, halogen, substituted and unsubstituted low molecular alkyl and alkoxy,
n represents one of the integers 1 and 2 and at least one of the ortho positions of the phenyl radical relative to the —NH— group is unsubstituted.

2. A process according to claim 1, wherein the acid dye is dye of the formula

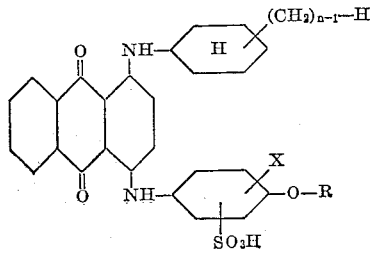

wherein
R is a member selected from the group consisting of unsubstituted lower alkyl, unsubstituted cycloalkyl, methylcycloalkyl and lower alkyl substituted with a member selected from the group consisting of a chlorine atom, cyano and hydroxy;
X is a member selected from the group consisting of a hydrogen atom, a chlorine atom, a bromine atom, a fluorine atom, unsubstituted lower alkyl, unsubstituted lower alkoxy, lower alkyl substituted by a member selected from the group consisting of a chlorine atom, cyano, hydroxy and phenyl, and lower alkoxy substituted with a member selected from the group consisting of a chlorine atom, cyano, hydroxy and phenyl; at least one of the ortho positions of the phenyl radical relative to the —NH group being unsubstituted; and
n is one of the integers 1 and 2.

3. A process according to claim 2, wherein the acid dye is of the formula

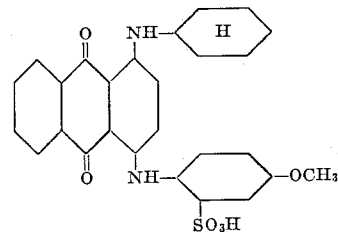

4. A process according to claim 2, wherein the acid dye is of the formula

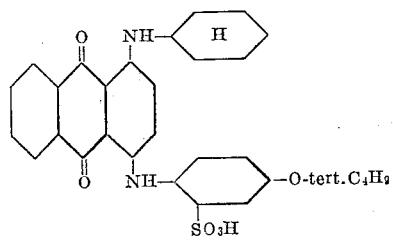

5. A process according to claim 2, wherein the acid dye is of the formula

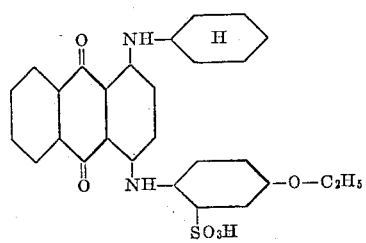

6. In the dyeing according to claim 1, the improvement wherein the acid dye is of said formula in which R is a member selected from the group consisting of lower alkyl and lower alkyl substituted with a substituent selected from the group consisting of chloro, cyano and hydroxy.

References Cited by the Examiner

UNITED STATES PATENTS 2,051,005  8/1936  Koeberle _____ 260—60
2,845,443  7/1958  Henderman _____ 8—39 X NORMAN G. TORCHIN, *Primary Examiner.*

DONALD LEVY, *Examiner.*